US011325074B2

(12) United States Patent
Cheng et al.

(10) Patent No.: US 11,325,074 B2
(45) Date of Patent: May 10, 2022

(54) POROUS MEMBRANE FOR WATER TREATMENT AND METHOD FOR PREPARING THE SAME

(71) Applicant: Shanghai Energy New Materials Technology Co., Ltd., Shanghai (CN)

(72) Inventors: Alex Cheng, Shanghai (CN); Lei Xiong, Shanghai (CN)

(73) Assignee: Shanghai Energy New Materials Technology Co., Ltd., Shanghai (CN)

( * ) Notice: Subject to any disclaimer, the term of this patent is extended or adjusted under 35 U.S.C. 154(b) by 0 days.

(21) Appl. No.: 16/477,642

(22) PCT Filed: May 21, 2018

(86) PCT No.: PCT/CN2018/087669
§ 371 (c)(1),
(2) Date: Jul. 12, 2019

(87) PCT Pub. No.: WO2019/210535
PCT Pub. Date: Nov. 7, 2019

(65) Prior Publication Data
US 2021/0331119 A1 Oct. 28, 2021

(30) Foreign Application Priority Data

May 4, 2018 (CN) .......................... 201810418279.3

(51) Int. Cl.
| B01D 67/00 | (2006.01) |
| B01D 69/02 | (2006.01) |
| B01D 71/26 | (2006.01) |
| B01D 71/38 | (2006.01) |
| C02F 1/44 | (2006.01) |
| H01M 50/417 | (2021.01) |
| H01M 50/406 | (2021.01) |
| H01M 10/0525 | (2010.01) |

(52) U.S. Cl.
CPC ....... B01D 67/0027 (2013.01); B01D 67/003 (2013.01); B01D 67/0013 (2013.01); B01D 69/02 (2013.01); B01D 71/26 (2013.01); B01D 71/38 (2013.01); C02F 1/44 (2013.01); H01M 50/406 (2021.01); H01M 50/417 (2021.01); B01D 2323/18 (2013.01); B01D 2325/02 (2013.01); B01D 2325/04 (2013.01); H01M 10/0525 (2013.01)

(58) Field of Classification Search
CPC .... B01D 2323/02; B01D 71/10; B01D 71/26; B01D 71/28
See application file for complete search history.

(56) References Cited

U.S. PATENT DOCUMENTS

| 6,602,593 | B1* | 8/2003 | Callahan | ................ | B01D 71/26 |
| | | | | | 428/316.6 |
| 2002/0034689 | A1* | 3/2002 | Hoshida | ................. | B01D 71/26 |
| | | | | | 429/254 |
| 2009/0208842 | A1 | 8/2009 | Harada et al. | | |
| 2010/0003591 | A1* | 1/2010 | Takita | ..................... | B32B 27/32 |
| | | | | | 429/145 |
| 2011/0223486 | A1* | 9/2011 | Zhang | ............... | H01M 10/0565 |
| | | | | | 429/247 |
| 2017/0373291 | A1 | 12/2017 | Kaneda et al. | | |
| 2018/0290109 | A1* | 10/2018 | Jaber | ...................... | B01D 71/26 |
| 2019/0267655 | A1* | 8/2019 | Yamaguchi | ............... | C25B 9/73 |
| 2021/0223486 | A1* | 7/2021 | Ott | ....................... | G02B 6/3889 |

FOREIGN PATENT DOCUMENTS

| CN | 101618295 A | 1/2010 |
| CN | 107200901 A | 9/2017 |
| JP | H11 302433 A | 11/1999 |
| JP | 2005-193201 A | 7/2005 |
| JP | 2012-508946 A | 4/2012 |
| JP | 2013-091059 A | 5/2013 |
| JP | 2015-193697 A | 11/2015 |
| KR | 2017-0100018 A | 9/2017 |

(Continued)

OTHER PUBLICATIONS

Notice of Reasons for Refusal, for Japanese Patent Application No. 2019-536930, dated Jun. 30, 2021 (4 pages).
Search Report and Written Opinion issued in PCT Application No. PCT/CN2018/087669, dated Jan. 29, 2019.
First Office Action for Korean Application No. 10-2019-1039030 dated Jun. 9, 2021.
First Office Action for Chinese Application No. 2018104182793, dated Aug. 31, 2020.

(Continued)

*Primary Examiner* — Ana M Fortuna
(74) *Attorney, Agent, or Firm* — Goodwin Procter LLP

(57) ABSTRACT

The present invention provides a porous membrane for water treatment, comprising: a high molecular weight polyethylene, a water-soluble polymer and an antioxidant, the high molecular weight polyethylene having an average molecular weight of $1.0 \times 10^5$ to $10.0 \times 10^6$ and a density of 0.940 to 0.976 g/cm$^3$; wherein, the weight of the water-soluble polymer is 5 to 50 parts, the weight of the antioxidant is 0.1 to 10 parts, based on 100 parts of the weight of the high molecular weight polyethylene. The porous membrane for water treatment prepared by the present invention has a thickness of 5 to 30 μm, a pore size of 10 to 100 nm, a porosity of 20 to 60%, and a surface contact angle of 30° to 95°. The porous membrane according to the present invention has good durability, simple preparation process, and relatively thin thickness, a uniform pore size distribution and small pore size, good hydrophilicity, as well as good filtration and adsorption effect.

13 Claims, 1 Drawing Sheet

(56) References Cited

FOREIGN PATENT DOCUMENTS

| | | |
|---|---|---|
| WO | WO-2009084719 A1 | 7/2009 |
| WO | WO-2010/072233 A1 | 7/2010 |
| WO | WO-2017/206593 A1 | 12/2017 |

OTHER PUBLICATIONS

Second Office Action for Chinese Application No. 201810418279.3, dated Apr. 6, 2021.
Extended European Search Report issued for corresponding European Application No. 18893321.2, dated Jan. 26, 2022.

* cited by examiner

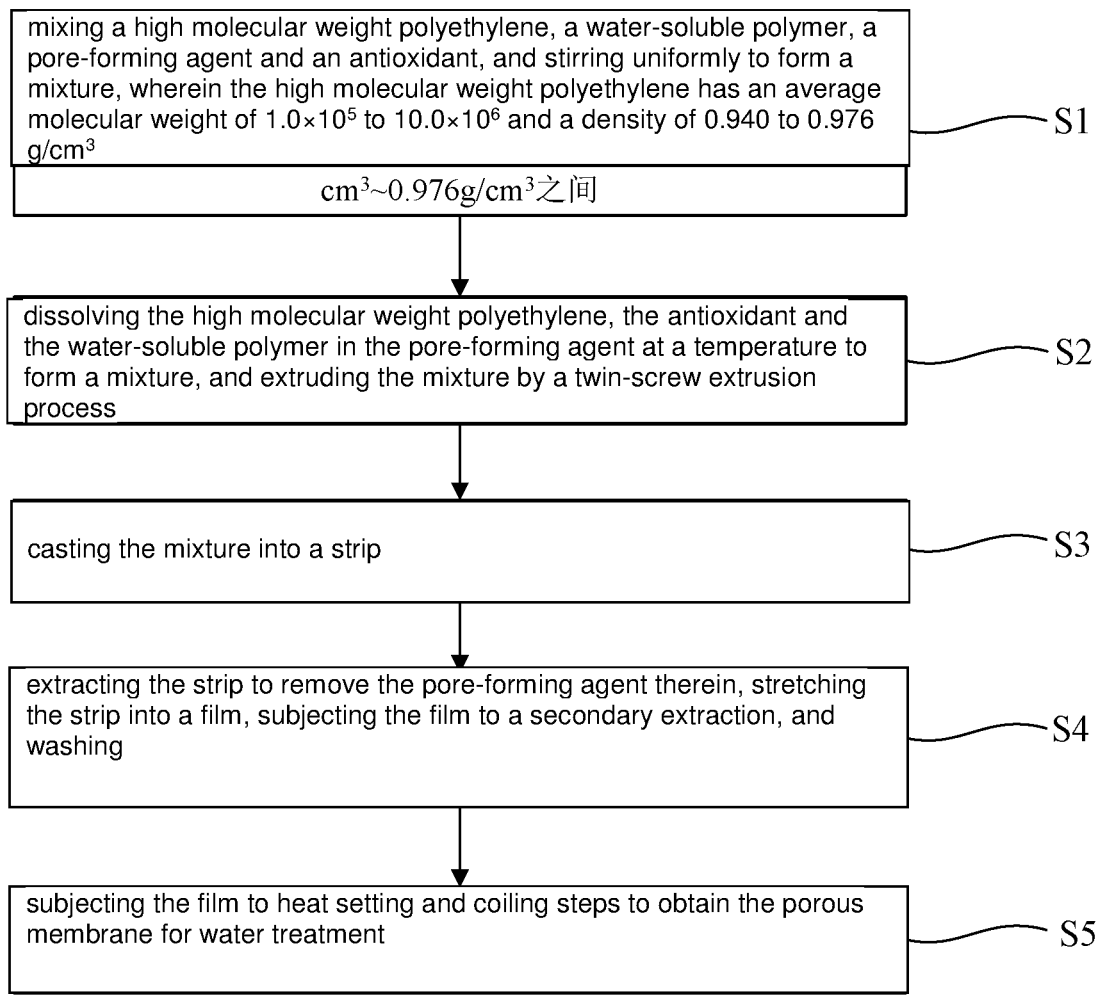

POROUS MEMBRANE FOR WATER TREATMENT AND METHOD FOR PREPARING THE SAME

CROSS REFERENCE TO RELATED APPLICATIONS

This application is the U.S. national stage of International (PCT) Patent Application No. PCT/CN2018/087669, filed May 21, 2018, which claims the benefit of and priority to Chinese Patent Application No. 201810418279.3, filed May 4, 2018, the entire disclosures of each of which are incorporated by reference herein.

TECHNICAL FIELD

The present invention relates to polymeric porous membrane technology, particularly to a porous membrane for water treatment and a method for preparing the same.

BACKGROUND ART

Porous membranes, as special films containing micropore distribution, are usually used for air filtration and purification, water treatment and purification, or as special separators for batteries and the like. Porous membranes are generally prepared by uniaxial tension, bidirectional tension, or phase conversion and other methods, and the membranes usually have through-holes to form porous membranes. The filtration and adsorption mechanism of porous membranes can be explained by screening theory; aggregate particles or molecules with a particle size smaller than membrane pores may pass the membrane pores, and aggregate particles or molecules with a particle size equal to membrane pores may block up the membrane pores, and aggregate particles or molecules with a particle size larger than membrane pores are retained by the membrane body. Further, charged ions are adsorbed and retained on the surface of membranes and in the membrane pores, and the particles smaller than the pore size forms a bridging retention at pore apertures, which also has a certain retention effect. Therefore, the pore size and the porosity of a porous membrane directly determine the final effect of filtration and adsorption. In addition, the thinner the membrane, the better the permeability, and the higher the efficiency of filtration and adsorption.

With respect to porous films for water treatment, it is particularly desired that their surfaces have good hydrophilicity to facilitate the wetting of water on the surfaces of the membranes and inside the pores to enhance the permeability of water. With respect to conventional porous membranes for water treatment, in order to enhance their hydrophilicity, some hydrophilic coatings are usually applied to the surfaces of the membranes. The hydrophilic coatings are generally thin in thickness, poor in durability and complicated in process, requiring frequent replacement, and therefore poor in durability. In addition, the porous membranes coated with hydrophilic coatings are thicker, have low uniformity of pore size distribution, relatively large pore size and poor hydrophilic effect, thus the performance of porous membranes is degraded.

Therefore, it is desired to propose a porous membrane for water treatment and a method for preparing the same, so as to overcome the poor durability and complicated preparation of porous membranes for water treatment in the prior art, while having a very thin thickness, a good pore size distribution and pore size, and good hydrophilicity.

SUMMARY OF THE INVENTION

In view of the above-mentioned shortcomings of the prior art, the object of the present invention is to provide a porous membrane for water treatment and a method of preparing the same, for solving the problems of poor durability, complicated preparation process, larger membrane thickness, large pore size and poor hydrophilicity of porous membranes for water treatment in the art.

To achieve the above and other related objects, the present invention provides a porous membrane for water treatment, comprising at least:

a high molecular weight polyethylene, a water-soluble polymer and an antioxidant, the high molecular weight polyethylene having an average molecular weight of $1.0 \times 10^5$ to $10.0 \times 10^6$ and a density of 0.940 to 0.976 $g/cm^3$;

wherein, the weight of the water-soluble polymer is 5 to 50 parts; the weight of the antioxidant is 0.1 to 10 parts, based on 100 parts of the weight of the high molecular weight polyethylene.

Preferably, the porous membrane for water treatment has a thickness of 5 μm to 30 μm, a pore size of 10 nm to 100 nm, a porosity of 20% to 60%, and a surface contact angle of 30° to 95°.

Preferably, the water-soluble polymer is one or more selected from the group consisting of carboxymethyl starch, starch acetate, hydroxymethyl cellulose, carboxymethyl cellulose, polyacrylamide, hydrolyzed polyacrylamide, ethyl cellulose, polymaleic anhydride, polyacrylic acid, polyvinylpyrrolidone, polyvinyl alcohol and polyethylene oxide.

Preferably, the antioxidant is one or more selected from the group consisting of 4,4-thiobis(6-tert-butyl-m-cresol), di butylhydroxytoluene, phosphite esters, tert-butyl hydroquinone, n-octadecyl β-(3,5-di-tert-butyl-4-hydroxyphenyl)-propionate, 1,1,3-tris(2-methyl-4-hydroxy-5-tert-butyl phenyl) butane, 2-tert-butyl-6-methylphenol, N,N'-bis(β-naphthyl) p-phenylenediamine, dilauryl thiodipropionate, trinonylphenyl phosphite, and triphenyl phosphite.

The present invention also provides a method for preparing a porous membrane for water treatment, the porous membrane for water treatment according to the present invention can be prepared by the method, the method comprising at least:

1) mixing a high molecular weight polyethylene, a water-soluble polymer, a pore-forming agent and an antioxidant, and stirring uniformly to form a mixture, wherein the high molecular weight polyethylene has an average molecular weight of $1.0 \times 10^5$ to $10.0 \times 10^6$ and a density of 0.940 to 0.976 $g/cm^3$; and the weight of the water-soluble polymer is 5 to 50 parts; the weight of the pore-forming agent is 100 to 500 parts; and the weight of the antioxidant is 0.1 to 10 parts, based on 100 parts of the weight of the high molecular weight polyethylene.

2) dissolving the high molecular weight polyethylene, the antioxidant and the water-soluble polymer in the pore-forming agent to form a mixture, and extruding the mixture by a twin-screw extrusion process;

3) casting the mixture into a strip;

4) extracting the strip to remove the pore-forming agent therein, stretching the strip into a film, subjecting the film to a secondary extraction, and then washing;

5) subjecting the film to heat setting and winding to obtain the porous membrane for water treatment.

Preferably, in the step 1), the high molecular weight polyethylene, the water-soluble polymer, the pore-forming agent and the antioxidant are added to a continuous mixing and charging kettle, mixed, and stirred uniformly at a speed of 45 to 55 rpm to form a mixture.

Preferably, in the step 2), the high molecular weight polyethylene, the antioxidant and the water-soluble polymer are dissolved in the pore-forming agent at a temperature of 170° C. to 230° C. to form a mixture, and then the mixture is continuously extruded at a speed of 150 to 250 rpm.

Preferably, in the step 3), the step of casting the mixture into a strip includes: the extruded mixture from the step 2) is continuously introduced into a slit die, and extruded through the slit die to a cooling cast roller and cast into a strip at a temperature of 70° C. to 90° C.

Preferably, in the step 4), the strip is extracted with dichloromethane as an extract to remove the pore-forming agent therein, and the strip is stretched by a bidirectional stretching machine at a temperature of 115° C. to 125° C. to form a film, and the film is subjected to a secondary extraction with dichloromethane, and then washed with deionized water.

Preferably, in the step 5), the film is heat set at a temperature of 115° C. to 125° C. for 15 to 20 min, and coiled at a speed of 20 to 50 m/min to obtain the porous membrane for water treatment.

Preferably, the water-soluble polymer is one or more selected from the group consisting of carboxymethyl starch, starch acetate, hydroxymethyl cellulose, carboxymethyl cellulose, polyacrylamide, hydrolyzed polyacrylamide, ethyl cellulose, polymaleic anhydride, polyacrylic acid, polyvinylpyrrolidone, polyvinyl alcohol and polyethylene oxide.

Preferably, the pore-forming agent is one or more selected from the group consisting of natural mineral oils, $C_{6-15}$ alkanes, $C_{8-15}$ aliphatic carboxylic acids, $C_{1-4}$ alkyl $C_{8-15}$ aliphatic carboxylates, $C_{2-6}$ halogenated alkanes, phthalates, trimellitates, adipates, sebacates, maleates, benzoates, epoxidized vegetable oils, benzenesulfonamides, phosphotriesters, glycol ethers, acetylated monoglyceride, citrate esters and diisononyl cyclohexane-1,2-dicarboxylate.

Preferably, the antioxidant is one or more selected from the group consisting of 4,4-thiobis(6-tert-butyl-m-cresol), dibutylhydroxytoluene, phosphite esters, tert-butyl hydroquinone, n-octadecyl β-(3,5-di-tert-butyl-4-hydroxyphenyl)-propionate, 1,1,3-tris(2-methyl-4-hydroxy-5-tert-butyl phenyl) butane, 2-tert-butyl-6-methylphenol, N,N'-bis(β-naphthyl) p-phenylenediamine, dilauryl thiodipropionate, and trinonylphenyl phosphite, and triphenyl phosphite.

Preferably, the pore-forming agent has a kinematic viscosity at 40° C. of 10 to 100 mm$^2$/s, and an initial boiling point of 110° C. or higher.

Therefore, the present invention provides a porous membrane for water treatment by the method mentioned above. The porous membrane for water treatment has a thickness of 5 to 30 μm, a pore size of 10 to 100 nm, a porosity of 20 to 60%, and a surface contact angle of 30° to 95°.

As described above, the porous membrane for water treatment and the method for preparing the same according to the present invention have the following advantageous effects:
1. The present invention prepares a porous membrane by adding a water-soluble polymer, which can significantly reduce the process complexity for preparing the porous membrane and reduce manufacturing cost;
2. The porous membrane for water treatment according to the present invention, by directly mixing a water-soluble polymer therein, does not need to apply a hydrophilic coating, thereby significantly improving the durability of the porous membrane and reducing the thickness of the porous membrane; in addition, the porous membrane has a small surface contact angle, significantly improving hydrophilic property; and the porous membrane has a small pore size and good pore size distribution, significantly improving filtration and adsorption effect; finally, the porous membrane can be used in batteries, especially in lithium-ion batteries, significantly improving the performance of lithium-ion batteries.

DESCRIPTION OF THE DRAWINGS

FIG. 1 is a flow diagram of a method for preparing a porous membrane for water treatment according to the present invention.

EXPLANATION OF REFERENCE SIGNS

S1~S5 steps

Embodiments

The embodiments of the present invention are described below by way of specific examples, and those skilled in the art can readily understand other advantages and effects of the present invention from the disclosure of the present specification. The present invention may be implemented or applied by other different specific embodiments. The various details of the present invention can be modified and changed without departing from the spirit of the invention based on different viewpoints and applications.

Please refer to FIG. 1. It should be noted that the diagram provided in the present example merely illustrate the basic concept of the present invention in a schematic manner, therefore the diagrams only show the components related to the present invention, rather than being drawn according to the number, shape and size of components in actual implementation. The shape, number and proportion of each component may be changed randomly in actual implementation, and the arrangement and shape of components may be more complicated.

The present invention provides a porous membrane for water treatment, comprising at least: a high molecular weight polyethylene, a water-soluble polymer and an antioxidant; the high molecular weight polyethylene has an average molecular weight of $1.0 \times 10^5$ to $10.0 \times 10^6$ and a density of 0.940 to 0.976 g/cm$^3$; wherein, the weight of the water-soluble polymer is 5 to 50 parts; the weight of the antioxidant is 0.1 to 10 parts, based on 100 parts of the weight of the high molecular weight polyethylene.

It should be noted that the high molecular weight polyethylene may be a single high molecular weight polyethylene or a mixture of two or more high molecular weight polyethylene. Therefore, the molecular weight of the high molecular weight polyethylene(s) is calculated in average molecular weight.

Preferably, the high molecular weight polyethylene has an average molecular weight of $1.0 \times 10^5$ to $5.0 \times 10^6$, more preferably $1.0 \times 10^5$ to $2.0 \times 10^6$.

Preferably, the high molecular weight polyethylene has a density of 0.940 to 0.966 g/cm$^3$, more preferably 0.950 to 0.976 g/cm$^3$.

Preferably, the weight of the water-soluble polymer is 10 to 40 parts, the weight of the pore-forming agent is 200 to 500 parts, and the weight of the antioxidant is 0.5 to 8 parts, based on 100 parts of the weight of the high molecular weight polyethylene.

More preferably, the weight of the water-soluble polymer is 20 to 30 parts, the weight of the pore-forming agent is 200 to 400 parts, and the weight of the antioxidant is 1 to 6 parts, based on 100 parts of the weight of the high molecular weight polyethylene.

The porous membrane for water treatment according to the present invention has a thickness of 5 to 30 μm, a pore size of 10 to 100 nm, a porosity of 20 to 60%, and a surface contact angle of 30° to 95°.

As an example, the water-soluble polymer comprises one or more selected from the group consisting of carboxymethyl starch, starch acetate, hydroxymethyl cellulose, carboxymethyl cellulose, polyacrylamide, hydrolyzed polyacrylamide, ethyl cellulose, polymaleic anhydride, polyacrylic acid, polyvinylpyrrolidone, polyvinyl alcohol and polyethylene oxide.

As an example, the antioxidant is one or more selected from the group consisting of 4,4-thiobis(6-tert-butyl-m-cresol), dibutylhydroxytoluene, phosphite esters, tert-butyl hydroquinone, n-octadecyl β-(3,5-di-tert-butyl-4-hydroxyphenyl)-propionate, 1,1,3-tris(2-methyl-4-hydroxy-5-tert-butyl phenyl) butane, 2-tert-butyl-6-methylphenol, N,N'-bis (β-naphthyl) p-phenylenediamine, dilauryl thiodipropionate, trinonylphenyl phosphite, and triphenyl phosphite.

As shown in FIG. 1, the present invention also provides a method for preparing a porous membrane for water treatment; the above-mentioned porous membrane for water treatment can be prepared by the method; the method comprising at least:

S1: mixing a high molecular weight polyethylene, a water-soluble polymer, a pore-forming agent and an antioxidant, and stirring uniformly to form a mixture; wherein the high molecular weight polyethylene has an average molecular weight of $1.0 \times 10^5$ to $10.0 \times 10^6$ and a density of 0.940 to 0.976 g/cm$^3$; and the weight of the water-soluble polymer is 5 to 50 parts, the weight of the pore-forming agent is 100 to 500 parts, and the weight of the antioxidant is 0.1 to 10 parts, based on 100 parts of the weight of the high molecular weight polyethylene.

S2: dissolving the high molecular weight polyethylene, the antioxidant and the water-soluble polymer in the pore-forming agent at a certain temperature to form a mixture, and extruding the mixture by a twin-screw extrusion process;

S3: casting the mixture into a strip;

S4: extracting the strip to remove the pore-forming agent therein, stretching the strip into a film, subjecting the film to a secondary extraction, and then washing;

S5: subjecting the membrane to heat setting and winding step to obtain the porous membrane for water treatment.

As an example, in the step S1, the high molecular weight polyethylene, the water-soluble polymer, the pore-forming agent and the antioxidant are added to a continuous mixing and charging kettle, mixed, and stirred uniformly at a speed of 45 to 55 rpm to form a mixture. Further, preferably, the weight of the water-soluble polymer is 10 to 40 parts, the weight of the pore-forming agent is 200 to 500 parts, and the weight of the antioxidant is 0.5 to 8 parts, based on 100 parts of the weight of the high molecular weight polyethylene. More preferably, the weight of the water-soluble polymer is 20 to 30 parts, the weight of the pore-forming agent is 200 to 400 parts, and the weight of the antioxidant is 1 to 6 parts, based on 100 parts of the weight of the high molecular weight polyethylene.

As an example, in the step S2, the high molecular weight polyethylene, the antioxidant and the water-soluble polymer are dissolved in the pore-forming agent at a temperature of 170° C. to 230° C. to form a mixture, and then the mixture is continuously extruded at a speed of 150 to 250 rpm.

As an example, in the step S3, the step of casting the mixture into a strip includes: the extruded mixture from the step S2 is continuously fed into a slit die, and extruded through the slit die to a cooling cast roller and cast into a strip at a temperature of 70° C. to 90° C.

As an example, in the step S4, the strip is extracted with dichloromethane as an extract to remove the pore-forming agent therein, and the strip is stretched by a bidirectional stretching machine at a temperature of 115° C. to 125° C. to form a film, and the film is subjected to a secondary extraction with dichloromethane, and then washed with deionized water.

As an example, in the step S5, the film is heat set at a temperature of 115° C. to 125° C. for 15 to 20 min, and coiled at a speed of 20 to 50 m/min to obtain the porous membrane for water treatment.

As an example, the water-soluble polymer is one or more selected from the group consisting of carboxymethyl starch, starch acetate, hydroxymethyl cellulose, carboxymethyl cellulose, polyacrylamide, hydrolyzed polyacrylamide, ethyl cellulose, polymaleic anhydride, polyacrylic acid, polyvinylpyrrolidone, polyvinyl alcohol and polyethylene oxide.

As an example, the pore-forming agent is one or more selected from the group consisting of natural mineral oils, $C_{6-15}$ alkanes, $C_{8-15}$ aliphatic carboxylic acids, $C_{1-4}$ alkyl $C_{8-15}$ aliphatic carboxylates, $C_{2-6}$ halogenated alkanes, phthalates, trimellitates, adipates, sebacates, maleates, benzoates, epoxidized vegetable oils, benzenesulfonamides, phosphotriesters, glycol ethers, acetylated monoglyceride, citrate esters and diisononyl cyclohexane-1,2-dicarboxylate.

As an example, the antioxidant is one or more selected from the group consisting of 4,4-thiobis(6-tert-butyl-m-cresol), dibutylhydroxytoluene, phosphite esters, tert-butyl hydroquinone, n-octadecyl β-(3,5-di-tert-butyl-4-hydroxyphenyl)-propionate, 1,1,3-tris(2-methyl-4-hydroxy-5-tert-butyl phenyl) butane, 2-tert-butyl-6-methylphenol, N,N'-bis (β-naphthyl) p-phenylenediamine, dilauryl thiodipropionate, trinonylphenyl phosphite, and triphenyl phosphite.

As an example, the pore-forming agent has a kinematic viscosity at 40° C. of 10 to 100 mm$^2$/s, and an initial boiling point of 110° C. or higher.

The porous membrane for water treatment according to the present invention can also be used in lithium-ion batteries, especially in power lithium-ion batteries.

The invention will be further illustrated below in combination with specific examples. It is to be understood that these examples are used only for illustrating the invention but not intended to limit the scope of the invention. The experimental methods in the following examples, whose specific conditions are not indicated, are usually carried out under conventional conditions or the conditions recommended by the manufacturers. All percentages, ratios, proportions, or parts are based on weight, unless otherwise specified. The unit of weight to volume percentage in present invention is well known to those skilled in the art and, for example, refers to the weight of the solute in 100 ml solution. Unless otherwise defined, all the professional and scientific terms used herein have the same meanings as known by a person skilled in the art. In addition, any methods and materials that are similar or equivalent to those described may be employed in the methods of the present invention. The preferred implementing methods and materials described herein are for illustrative purposes only.

The parameters in the following example tables are measured by following methods.

1. Thickness

The thickness is measured by a method of measuring the thickness of plastic film and sheet according to GB/T6672-2001 using Germany Marr film thickness gauge 1216.

2. Porosity

The porosity is measured by means of PMI AAQ-3K-A-1 porometer.

3. Pore Size

The pore size is measured by means of PMI AAQ-3K-A-1 porometer.

4. Contact Angle

As used herein, "contact angle" refers to the contact angle of water or an aqueous solution on a film layer and is measured with deionized water at room temperature using a Kruss DSA25 contact angle meter.

Example 1

100 g of high molecular weight polyethylene having a density of 0.957 g/cm$^3$ and an average molecular weight of 5.0×10$^5$, 0.5 g of dibutyl hydroxytoluene (an antioxidant), 5 g of polyethylene oxide, and 250 g of mineral oil were added to a continuous mixing and charging kettle, and stirred at a speed of 50 rpm to mix the raw materials uniformly.

The mixture was continuously added to a twin-screw extruder, and the high molecular weight polyethylene, the antioxidant and polyethylene oxide were continuously dissolved in the mineral oil in a twin-screw extruder at 180° C., and continuously extruded by the twin-screw extruder at a speed of 200 rpm. The mixture was continuously introduced into a slit die, and extruded through the slit die to a cooling cast roller and cast into a strip at 80° C.

The obtained strip was placed in an extraction tank containing dichloromethane for extraction to remove the mineral oil from the strip. The extracted strip was continuously fed into a bidirectional stretching machine at 120° C. and stretched into a film, then the resulting film material was subjected to a secondary extraction with dichloromethane, and the resulting film was washed with deionized water. Then the film was heat set at 120° C. for 15 min, and coiled at a speed of 20 m/min to directly obtain a porous membrane for water treatment. Its specific performance parameters were tested, as shown in table 1:

TABLE 1

| | |
|---|---|
| Thickness | 12 μm |
| Porosity | 48% |
| Pore size | 0.046 μm |
| Contact angle | 95° |

Example 2

100 g of high molecular weight polyethylene having a density of 0.957 g/cm$^3$ and an average molecular weight of 5.0×10$^5$, 0.5 g of dibutylhydroxytoluene (an antioxidant), 10 g of polyethylene oxide, and 250 g of mineral oil were added to a continuous mixing and charging kettle, and stirred at a speed of 50 rpm to mix the raw materials uniformly.

The mixture was continuously added to a twin-screw extruder, and the high molecular weight polyethylene, the antioxidant and the polyethylene oxide were continuously dissolved in the mineral oil in the twin-screw extruder at 180° C., and continuously extruded by the twin-screw extruder at a speed of 200 rpm. The mixture was continuously introduced into a slit die, and extruded through the slit die to a cooling cast roller and cast into a strip at 80° C.

The obtained strip was placed in an extraction tank containing dichloromethane for extraction to remove the mineral oil from the strip. The extracted strip was continuously fed into a bidirectional stretching machine at 120° C. and stretched into a film, then the resulting film material was subjected to a secondary extraction with dichloromethane, and the resulting film was washed with deionized water. Then the film was heat set at 120° C. for 15 min, and coiled at a speed of 20 m/min to directly obtain a porous membrane for water treatment. Its specific performance parameters were tested, as shown in table 2:

TABLE 2

| | |
|---|---|
| Thickness | 12 μm |
| Porosity | 45% |
| Pore size | 0.047 μm |
| Contact angle | 90° |

Example 3

100 g of high molecular weight polyethylene having a density of 0.957 g/cm$^3$ and an average molecular weight of 5.0×10$^5$, 0.5 g of dibutylhydroxytoluene (an antioxidant), 15 g of polyethylene oxide, and 250 g of mineral oil were added to a continuous mixing and charging kettle, and stirred at a speed of 50 rpm to mix the raw materials uniformly.

The mixture was continuously added to a twin-screw extruder, and the high molecular weight polyethylene, the antioxidant and the polyethylene oxide were continuously dissolved in the mineral oil in the twin-screw extruder at 180° C., and continuously extruded by the twin-screw extruder at a speed of 200 rpm. The mixture was continuously introduced into a slit die, and extruded through the slit die to a cooling cast roller and cast into a strip at 80° C.

The obtained strip was placed in an extraction tank containing dichloromethane for extraction to remove the mineral oil from the strip. The extracted strip was continuously fed into a bidirectional stretching machine at 120° C. and stretched into a film, then the resulting film material was subjected to a secondary extraction with dichloromethane, and the resulting film was washed with deionized water. Then the film was heat set at 120° C. for 15 min, and coiled at a speed of 20 m/min to directly obtain a porous membrane for water treatment. Its specific performance parameters were tested, as shown in table 3:

TABLE 3

| | |
|---|---|
| Thickness | 12 μm |
| Porosity | 45% |
| Pore size | 0.045 μm |
| Contact angle | 82° |

Example 4

100 g of high molecular weight polyethylene having a density of 0.957 g/cm$^3$ and an average molecular weight of 5.0×10$^5$, 0.5 g of dibutylhydroxytoluene (an antioxidant), 25 g of polyethylene oxide, and 250 g of mineral oil were added to a continuous mixing and charging kettle, and stirred at a speed of 50 rpm to mix the raw materials uniformly.

The mixture was continuously added to a twin-screw extruder, and the high molecular weight polyethylene, the antioxidant and the polyethylene oxide were continuously dissolved in the mineral oil in the twin-screw extruder at 180° C., and continuously extruded by the twin-screw extruder at a speed of 200 rpm. The mixture was continuously introduced into a slit die, and extruded through the slit die to a cooling cast roller and cast into a strip at 80° C.

The obtained strip was placed in an extraction tank containing dichloromethane for extraction to remove the mineral oil from the strip. The extracted strip was continuously fed into a bidirectional stretching machine at 120° C. and stretched into a film, then the resulting film material was subjected to a secondary extraction with dichloromethane, and the resulting film was washed with deionized water. Then the film was heat set at 120° C. for 15 min, and coiled at a speed of 20 m/min to directly obtain a porous membrane for water treatment. Its specific performance parameters were tested, as shown in table 4:

TABLE 4

| Thickness | 12 μm |
|---|---|
| Porosity | 49% |
| Pore size | 0.050 μm |
| Contact angle | 63° |

Example 5

100 g of high molecular weight polyethylene having a density of 0.957 g/cm$^3$ and an average molecular weight of 5.0×10$^5$, 0.5 g of dibutylhydroxytoluene (an antioxidant), 20 g of polyethylene oxide, 5 g of polyvinylpyrrolidone, and 250 g of mineral oil were added to a continuous mixing and charging kettle, and stirred at a speed of 50 rpm to mix the raw materials uniformly.

The mixture was continuously added to a twin-screw extruder, and the high molecular weight polyethylene, the antioxidant and the polyethylene oxide were continuously dissolved in the mineral oil in the twin-screw extruder at 180° C., and continuously extruded by the twin-screw extruder at a speed of 200 rpm. The mixture was continuously introduced into a slit die, and extruded through the slit die to a cooling cast roller and cast into a strip at 80° C.

The obtained strip was placed in an extraction tank containing dichloromethane for extraction to remove the mineral oil from the strip. The extracted strip was continuously fed into a bidirectional stretching machine at 120° C. and stretched into a film, then the resulting film material was subjected to a secondary extraction with dichloromethane, and the resulting film was washed with deionized water. Then the film was heat set at 120° C. for 15 min, and coiled at a speed of 20 m/min to directly obtain a porous membrane for water treatment. Its specific performance parameters were tested, as shown in table 5:

TABLE 5

| Thickness | 12 μm |
|---|---|
| Porosity | 50% |
| Pore size | 0.036 μm |
| Contact angle | 62° |

Comparative Example 100 g of high molecular weight polyethylene having a density of 0.957 g/cm$^3$ and an average molecular weight of 5.0×10$^5$, 0.5 g of dibutylhydroxytoluene (an antioxidant), and 250 g of mineral oil were added to a continuous mixing and charging kettle, and stirred at a speed of 50 rpm to mix the raw materials uniformly.

The mixture was continuously added to a twin-screw extruder, and the high molecular weight polyethylene, the antioxidant and the polyethylene oxide were continuously dissolved in the mineral oil in the twin-screw extruder at 180° C., and continuously extruded by the twin-screw extruder at a speed of 200 rpm. The mixture was continuously introduced into a slit die, and extruded through the slit die to a cooling cast roller and cast into a strip at 80° C.

The obtained strip was placed in an extraction tank containing dichloromethane for extraction to remove the mineral oil from the strip. The extracted strip was continuously fed into a bidirectional stretching machine at 120° C. and stretched into a film, then the resulting film material was subjected to a secondary extraction with dichloromethane, and the resulting film was washed with deionized water. Then the film was heat set at 120° C. for 15 min, and coiled at a speed of 20 m/min to directly obtain a porous membrane for water treatment. Its specific performance parameters were tested, as shown in table 6:

TABLE 6

| Thickness | 12 μm |
|---|---|
| Porosity | 49% |
| Pore size | 0.048 μm |
| Contact angle | 112° |

Example 6

100 g of high molecular weight polyethylene having a density of 0.957 g/cm$^3$ and an average molecular weight of 5.0×10$^5$, 0.5 g of dibutylhydroxytoluene (an antioxidant), 30 g of polyethylene oxide, and 250 g of mineral oil were added to a continuous mixing and charging kettle, and stirred at a speed of 50 rpm to mix the raw materials uniformly.

The mixture was continuously added to a twin-screw extruder, and the high molecular weight polyethylene, the antioxidant and the polyethylene oxide were continuously dissolved in the mineral oil in the twin-screw extruder at 180° C., and continuously extruded by the twin-screw extruder at a speed of 200 rpm. The mixture was continuously introduced into a slit die, and extruded through the slit die to a cooling cast roller and cast into a strip at 80° C.

The obtained strip was placed in an extraction tank containing dichloromethane for extraction to remove the mineral oil from the strip. The extracted strip was continuously fed into a bidirectional stretching machine at 120° C. and stretched into a film, then the resulting film material was subjected to a secondary extraction with dichloromethane, and the resulting film was washed with deionized water. Then the film was heat set at 120° C. for 15 min, and coiled at a speed of 20 m/min to directly obtain a porous membrane for water treatment. Its specific performance parameters were tested, as shown in table 7:

TABLE 7

| Thickness | 12 μm |
|---|---|
| Porosity | 49% |
| Pore size | 0.046 μm |
| Contact angle | 75° |

Example 7

100 g of high molecular weight polyethylene having a density of 0.957 g/cm$^3$ and an average molecular weight of 5.0×10$^5$, 0.5 g of dibutylhydroxytoluene (an antioxidant), 40 g of polyethylene oxide, and 250 g of mineral oil were added to a continuous mixing and charging kettle, and stirred at a speed of 50 rpm to mix the raw materials uniformly.

The mixture was continuously added to a twin-screw extruder, and the high molecular weight polyethylene, the antioxidant and the polyethylene oxide were continuously dissolved in the mineral oil in the twin-screw extruder at 180° C., and continuously extruded by the twin-screw extruder at a speed of 200 rpm. The mixture was continuously introduced into a slit die, and extruded through the slit die to a cooling cast roller and cast into a strip at 80° C.

The obtained strip was placed in an extraction tank containing dichloromethane for extraction to remove the mineral oil from the strip. The extracted strip was continuously fed into a bidirectional stretching machine at 120° C. and stretched into a film, then the resulting film material was subjected to a secondary extraction with dichloromethane, and the resulting film was washed with deionized water.

Then the film was heat set at 120° C. for 15 min, and coiled at a speed of 20 m/min to directly obtain a porous membrane for water treatment. Its specific performance parameters were tested, as shown in table 8:

TABLE 8

| | |
|---|---|
| Thickness | 12 μm |
| Porosity | 46% |
| Pore size | 0.048 μm |
| Contact angle | 85° |

Example 8

100 g of high molecular weight polyethylene having a density of 0.957 g/cm$^3$ and an average molecular weight of 5.0×10$^5$, 0.5 g of dibutylhydroxytoluene (an antioxidant), 50 g of polyethylene oxide, and 250 g of mineral oil were added to a continuous mixing and charging kettle, and stirred at a speed of 50 rpm to mix the raw materials uniformly.

The mixture was continuously added to a twin-screw extruder, and the high molecular weight polyethylene, the antioxidant and the polyethylene oxide were continuously dissolved in the mineral oil in the twin-screw extruder at 180° C., and continuously extruded by the twin-screw extruder at a speed of 200 rpm. The mixture was continuously introduced into a slit die, and extruded through the slit die to a cooling cast roller and cast into a strip at 80° C.

The obtained strip was placed in an extraction tank containing dichloromethane for extraction to remove the mineral oil from the strip. The extracted strip was continuously fed into a bidirectional stretching machine at 120° C. and stretched into a film, then the resulting film material was subjected to a secondary extraction with dichloromethane, and the resulting film was washed with deionized water. Then the film was heat set at 120° C. for 15 min, and coiled at a speed of 20 m/min to directly obtain a porous membrane for water treatment. Its specific performance parameters were tested, as shown in table 9:

TABLE 9

| | |
|---|---|
| Thickness | 12 μm |
| Porosity | 47% |
| Pore size | 0.048 μm |
| Contact angle | 95° |

It can be seen from the above experimental results that the porous membranes obtained in Examples 1 to 8 added with a water-soluble polymer have a contact angle significantly lower than the porous membrane obtained in Comparative Example; and within a certain weight range, when the amount of the water-soluble polymer added is increased, the contact angle of the porous membrane is further lowered (see Examples 1 to 5); moreover, when the amount of the water-soluble polymer added is 25 parts by weight, the lowest contact angle is achieved (see Examples 4 and 5); these results indicate that the addition of a water-soluble polymer can significantly improve the surface hydrophilicity of porous membranes.

Moreover, it can be further seen from Examples 6 to 8 that when the amount of the water-soluble polymer added exceeds 30 parts by weight, the contact angle of the porous membrane starts to increase remarkably. This indicates that when the water-soluble polymer is added in an amount exceeding a certain range, it will not be effective in terms of improving hydrophilicity.

In addition, as shown in Examples 4 and 5, the weight of the water-soluble polymer added is the same, except that Example 4 is a water-soluble polymer of a single component, whereas Example 5 is a mixture of water-soluble polymers of two components. The results indicate that synergistic use of two different water-soluble polymers can reduce the pore size as much as possible while ensuring a low contact angle on the surface of the porous membrane, which is related to the formation of more physical entanglement points between the water-soluble polymers and the high molecular weight polyethylene.

The technical contents and features of the present invention have been disclosed above. The components of the porous membrane for water treatment according to the present invention are not limited to the materials mentioned in the present invention, nor the formulations mentioned in the present invention; other materials and formulations having similar properties are also covered by the present invention. Those skilled in the art can still make various substitutions and modifications without departing from the spirit of the invention. Therefore, the scope of the present invention shall not be limited to the content disclosed by the examples, but shall include various substitutions and modifications that do not depart from the present invention and be covered by the attached claims.

The invention claimed is:

1. A porous membrane for water treatment, consisting essentially of: a high molecular weight polyethylene, a water-soluble polymer and an antioxidant, the high molecular weight polyethylene having an average molecular weight of 1.0×10$^5$ to 10.0×10$^6$ and a density of 0.940 to 0.976 g/cm$^3$;

wherein, the weight of the water-soluble polymer is 20 to 50 parts, the weight of the antioxidant is 0.1 to 10 parts, based on 100 parts of the weight of the high molecular weight polyethylene;

the porous membrane for water treatment has a thickness of 5 to 30 μm, a pore size of 10 to 100 nm, a porosity of 20 to 60%, and a surface contact angle of 30° to 95°.

2. The porous membrane for water treatment according to claim 1, characterized in that the water-soluble polymer is one or more selected from the group consisting of carboxymethyl starch, starch acetate, hydroxymethyl cellulose, carboxymethyl cellulose, polyacrylamide, hydrolyzed polyacrylamide, ethyl cellulose, polymaleic anhydride, polyacrylic acid, polyvinylpyrrolidone, polyvinyl alcohol and polyethylene oxide.

3. The porous membrane for water treatment according to claim 1, characterized in that the antioxidant is one or more selected from the group consisting of 4,4-thiobis(6-tert-butyl-m-cresol), dibutylhydroxytoluene, phosphite ester, tert-butyl hydroquinone, n-octadecyl β-(3,5-di-tert-butyl-4-hydroxyphenyl)-propionate, 1,1,3-tris(2-methyl-4-hydroxy-5-tert-butylphenyl) butane, 2-tert-butyl-6-methylphenol, N,N'-bis(β-naphthyl) p-phenylenediamine, dilauryl thiodipropionate, trinonylphenyl phosphite, and triphenyl phosphite.

4. A method for preparing a porous membrane for water treatment, the method comprising at least:
 1) mixing a high molecular weight polyethylene, a water-soluble polymer, a pore-forming agent and an antioxidant, and stirring uniformly to form a mixture, wherein the high molecular weight polyethylene has an average molecular weight of $1.0 \times 10^5$ to $10.0 \times 10^6$ and a density of 0.940 to 0.976 g/cm$^3$; and the weight of the water-soluble polymer is 20 to 50 parts, the weight of the pore-forming agent is 100 to 500 parts, and the weight of the antioxidant is 0.1 to 10 parts, based on 100 parts of the weight of the high molecular weight polyethylene;
 2) dissolving the high molecular weight polyethylene, the antioxidant and the water-soluble polymer in the pore-forming agent at a temperature to form a mixture, and extruding the mixture by a twin-screw extrusion process;
 3) casting the mixture into a strip;
 4) extracting the strip to remove the pore-forming agent therein, stretching the strip into a film, subjecting the film to a secondary extraction, and washing;
 5) subjecting the film to heat setting and coiling steps to obtain the porous membrane for water treatment.

5. The method for preparing a porous membrane for water treatment according to claim 4, characterized in that in the step 1), the high molecular weight polyethylene, the water-soluble polymer, the pore-forming agent and the antioxidant are added to a continuous mixing and charging kettle, mixed, and stirred uniformly at a speed of 45-55 rpm to form the mixture.

6. The method for preparing a porous membrane for water treatment according to claim 4, characterized in that in the step 2), the high molecular weight polyethylene, the antioxidant and the water-soluble polymer are dissolved in the pore-forming agent at a temperature of 170-230° C. to form a mixture, and then the mixture is continuously extruded at a speed of 150-250 rpm.

7. The method for preparing a porous membrane for water treatment according to claim 4, characterized in that in the step 3), the step of casting the mixture into a strip includes: the extruded mixture from the step 2) is continuously introduced into a slit die, and extruded through the slit die to a cooling cast roller and cast into a strip at a temperature of 70 to 90° C.

8. The method for preparing a porous membrane for water treatment according to claim 4, characterized in that in the step 4), the strip is extracted with dichloromethane as an extract to remove the pore-forming agent in the strip, and the strip is stretched by a bidirectional stretching machine at a temperature of 115 to 125° C. to form a film, and the film is subjected to a secondary extraction with dichloromethane, and washed with deionized water.

9. The method for preparing a porous membrane for water treatment according to claim 4, characterized in that in the step 5), the film is heat set at a temperature of 115 to 125° C. for 15 to 20 min, and coiled at a speed of 20 to 50 m/min to obtain the porous membrane for water treatment.

10. The method for preparing a porous membrane for water treatment according to claim 4, characterized in that the water-soluble polymer is one or more selected from the group consisting of carboxymethyl starch, starch acetate, hydroxymethyl cellulose, carboxymethyl cellulose, polyacrylamide, hydrolyzed polyacrylamide, ethyl cellulose, polymaleic anhydride, polyacrylic acid, polyvinylpyrrolidone, polyvinyl alcohol and polyethylene oxide.

11. The method for preparing a porous membrane for water treatment according to claim 4, characterized in that the pore-forming agent is one or more selected from the group consisting of natural mineral oils, C6-15 alkanes, C8-15 aliphatic carboxylic acids, C1-4 alkyl C8-15 aliphatic carboxylates, C2-6 halogenated alkanes, phthalates, trimellitates, adipates, sebacates, maleates, benzoates, epoxidized vegetable oils, benzenesulfonamides, phosphotriesters, glycol ethers, acetylated monoglyceride, citrate esters and diisononyl cyclohexane-1,2-dicarboxylate.

12. The method for preparing a porous membrane for water treatment according to claim 4, characterized in that the antioxidant is one or more selected from the group consisting of 4,4-thiobis(6-tert-butyl-m-cresol), dibutylhydroxytoluene, phosphite esters, tert-butyl hydroquinone, n-octadecyl β-(3,5-di-tert-butyl-4-hydroxyphenyl)-propionate, 1,1,3-tris(2-methyl-4-hydroxy-5-tert-butylphenyl) butane, 2-tert-butyl-6-methylphenol, N,N'-bis(β-naphthyl) p-phenylenediamine, dilauryl thiodipropionate, trinonylphenyl phosphite, and triphenyl phosphite.

13. The method for preparing a porous membrane for water treatment according to claim 4, characterized in that the pore-forming agent has a kinematic viscosity at 40° C. of 10 to 100 mm$^2$/s, and an initial boiling point of 110° C. or higher.

* * * * *